US011400544B2

(12) United States Patent
Nauka et al.

(10) Patent No.: US 11,400,544 B2
(45) Date of Patent: Aug. 2, 2022

(54) SELECTIVE LASER MELTING (SLM) ADDITIVE MANUFACTURING

(71) Applicant: HEWLETT-PACKARD DEVELOPMENT COMPANY, L.P., Spring, TX (US)

(72) Inventors: Krzysztof Nauka, Palo Alto, CA (US); John Samuel Dilip Jangam, Palo Alto, CA (US); Seongsik Chang, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/606,245

(22) PCT Filed: Jun. 8, 2018

(86) PCT No.: PCT/US2018/036753
§ 371 (c)(1),
(2) Date: Oct. 18, 2019

(87) PCT Pub. No.: WO2019/236108
PCT Pub. Date: Dec. 12, 2019

(65) Prior Publication Data
US 2021/0331271 A1    Oct. 28, 2021

(51) Int. Cl.
*B23K 26/03* (2006.01)
*B33Y 30/00* (2015.01)
(Continued)

(52) U.S. Cl.
CPC .......... *B23K 26/032* (2013.01); *B23K 26/342* (2015.10); *B33Y 30/00* (2014.12); *B33Y 50/02* (2014.12); *G01N 21/8806* (2013.01)

(58) Field of Classification Search
None
See application file for complete search history.

(56) References Cited

U.S. PATENT DOCUMENTS 9,676,145 B2    6/2017  Buller et al.
9,931,697 B2    4/2018  Levin et al.
(Continued)

FOREIGN PATENT DOCUMENTS

CN    1281973 A  *  1/2001  ......... H04B 10/2941
JP    2017049243 A    3/2017
(Continued)

OTHER PUBLICATIONS

Machine Translation of CN 1281973 performed on Dec. 7, 2021, Hatayama (Year: 2001).*

(Continued)

*Primary Examiner* — Brian W Jennison
*Assistant Examiner* — Kevin Guanhua Wen
(74) *Attorney, Agent, or Firm* — Fabian VanCott

(57) ABSTRACT

An in-situ monitoring device for selective laser melting (SLM) additive manufacturing may include at least one coherent electromagnetic wave source to produce a detection beam, an interferometer interposed between the electromagnetic wave source and a target detection area, a photodetector to detect displacement measuring interference between electromagnetic waves from the electromagnetic wave source and reflected electromagnetic waves from the target detection area through the interferometer, and control logic to cause the detection beam to follow a print path of a material forming laser at a distance behind the material forming laser. The detection beam is placed on a laser-melted and at least partially solidified portion of a layer of a three-dimensional (3D) object formed by the material forming laser.

20 Claims, 7 Drawing Sheets

(51) Int. Cl.
  B33Y 50/02 (2015.01)
  B23K 26/342 (2014.01)
  G01N 21/88 (2006.01)

(56) References Cited

U.S. PATENT DOCUMENTS

| | | |
|---|---|---|
| 2009/0206065 A1 | 8/2009 | Kruth et al. |
| 2014/0094954 A1 | 4/2014 | Griffiths et al. |
| 2016/0236414 A1 | 8/2016 | Reese et al. |
| 2017/0120337 A1 | 5/2017 | Kanke et al. |
| 2017/0239892 A1* | 8/2017 | Buller et al. ........ B29C 67/0088 |
| 2017/0266762 A1 | 9/2017 | Dave et al. |
| 2017/0348900 A1 | 12/2017 | Williams et al. |
| 2018/0065186 A1 | 3/2018 | Cullinan et al. |

FOREIGN PATENT DOCUMENTS

| | | |
|---|---|---|
| RU | 2502102 C2 | 12/2013 |
| WO | WO2007120403 A3 | 10/2007 |
| WO | WO2014083277 A1 | 6/2014 |
| WO | WO2014155191 A2 | 10/2014 |

OTHER PUBLICATIONS

Badami, et al;"Displacement Measuring Interferometry"; Handbook of Optical Dimensional Technology; pp. 157-237; CRC Press 2013 (ISBN 9781439854815—CAT#K12551).
Bobroff; "Recent Advances in Displacement Measuring Interferometry"; Meas. Sci. Technol. 4, 907 (1993).
Zygo Corporation; "Displacement Measuring Interferometry Primer"; Jan. 1990; (https://www.zygo.com/library/papers/aspe_33_89.pdf).

* cited by examiner

SELECTIVE LASER MELTING (SLM) ADDITIVE MANUFACTURING

BACKGROUND

Some additive manufacturing systems produce three-dimensional (3D) objects by budding up layers of material and combining those layers using adhesives, heat, chemical reactions, and other coupling processes. Some additive manufacturing systems may be referred to as "3D printers." The additive manufacturing systems make it possible to convert a computer aided design (CAD) model or other digital representation of an object into a physical object. Digital data is processed into slices each defining that part of a layer or layers of build material to be formed into the object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
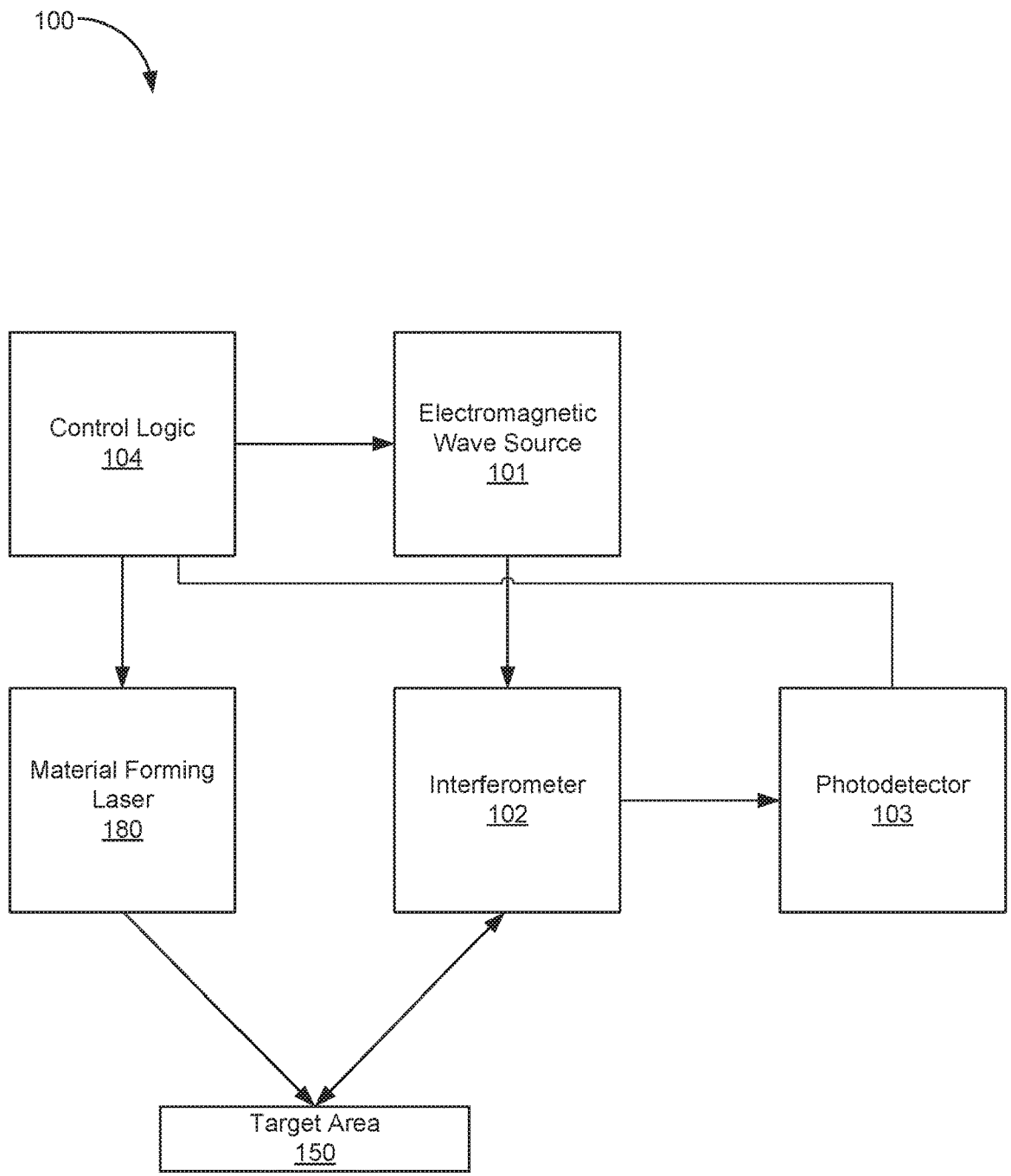
FIG. 1 is a block diagram of an in-situ monitoring device for selective laser melting (SLM) additive manufacturing, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

As described herein, some additive manufacturing devices and systems use a build technique referred to as selective laser melting (SLM). SLM is an additive manufacturing technique that uses a material-forming laser as the power source to heat, melt, or sinter powdered material such as metals, ceramics, and other materials, aiming the laser automatically at points in space defined by a 3D model, melting the material together to create a solid structure. In some examples, SLM additive manufacturing processes melt a metal powder to a temperature above that metal powder's melting point in order to maintain presence of a melted pool of metal material continually along a print path and allowing the melted metal material to solidify after the melting. Overheating the molten metal pool and surrounding regions may increase the probability that defects are formed in the 3D object.

SLM is popular as a 3D metal additive manufacturing process and aims the material-forming laser automatically at points in space defined by a 3D model. The laser melts the material together to create a solid structure allowing at least one of a number of different properties of the material to be altered such as, for example, magnitudes or degrees of texture, porosity, rigidity, pliability, elasticity, strength, reflectivity, intensity, conductivity, and chromaticity, among other properties of the formed 3D object. Further, the alteration of the at least one property may include heating, drying, curing, melting, or fusing, as well as additional transformations, such as plasticization, or other chemical changes.

SLM additive manufacturing processes rely on heating a small area on the surface of a bed of metal powder with a focused laser beam capable of raising an irradiated powder's temperature above the metal melting point. The movement or scanning of the laser beam provides stitching of the heated, sintered, or molten metal pools to solidify into an extended solid metal shape. However, this process may suffer from a poor quality of printed objects due to large thermal stresses present near the irradiated region and residual stress building up during the build process may cause local deformation of the printed object and even produce microcracks. This deleterious phenomenon may be further exacerbated by rapid density increase when loosely packed powder is fused and melted into a solid metal. These defects, having dimensions between a submicron and tens of microns, may be buried within the printed object by subsequently deposited and laser melted metal layers. The presence of these defects may be revealed when the newly printed object prematurely fails while being used by, for example, a customer who purchased or had made the 3D object produced. These types of defects and failure of the printed part may result in significant damage to property and result in liability to the manufacturer of the printed part.

Thus, a lack of an in-situ, in-line sensing technique allowing defect detection to stop printing or adjust the printing condition to avoid further defect formation may have a serious impact on the reliability of printing processes and on the overall economic viability of this 3D printing technology. As described herein, the an in-situ, in-line sensing technique may include the use of at least one coherent electromagnetic wave source such as a second laser that produces a detection beam. An interferometer may be interposed between the second laser to create an interference pattern of light that may be detected by a photodetector. The signals received by the photodetector may indicate whether a defect exists within the printed object. Although the examples described herein use SLM as the additive manufacturing process, other types of additive manufacturing may benefit from the in-situ, in-line sensing technique described herein including laser sintering, selective laser sintering, direct metal laser sintering, laser melting, direct laser deposition, direct energy deposition, electron beam melting, powder bed 3D printing, powder bed fusion, electron irradiation (e-beam), or any variants, derivatives, or combinations thereof, Examples described herein provide an in-situ monitoring device for selective laser melting (SLM) additive manufacturing. The in-situ monitoring device for selective laser melting (SLM) additive manufacturing may include at least one coherent electromagnetic wave source to produce a detection beam, an interferometer interposed between the electromagnetic wave source and a target detection area, a photodetector to detect displacement measuring interference between electromagnetic waves from the electromagnetic wave source and reflected electromagnetic waves from the target detection area through the interferometer, and control logic to cause the detection beam to follow a print path of a material forming laser at a distance behind the material forming laser. The detection beam may be placed on a laser-melted portion of a layer of a three-dimensional (3D) object formed by the material forming laser.

The interferometer may be a Fabry-Perot interferometer, a Mach-Zehnder interferometer, a Michelson interferometer, a Fizeau interferometer, or a Tvyman-Green interferometer or any other optical interferometer. Further, the interferometer may include a narrow band optical filter interposed between a beam splitter of the interferometer and the target detection area to prevent scattered remnants of electromagnetic waves from the material forming laser from entering the interferometer. In one example, the monitoring device uses homodyne detection. In another example, the monitoring device uses heterodyne detection. The print path of the material forming laser is defined by a print data file defining the print layers of a 3D object.

Examples described herein also provide a selective laser melting (SLM) additive manufacturing device. The SLM additive manufacturing device may include a material forming laser to form layers of a three-dimensional (3D) object, a coherent electromagnetic wave source to produce a detection beam, an interferometer interposed between the electromagnetic wave source and a target detection area, a photodetector to detect displacement measuring interference between electromagnetic waves from the electromagnetic wave source and reflected electromagnetic waves from the target detection area through the interferometer, and control logic to cause the detection beam to follow a print path of the material forming laser. The detection beam is placed on a re-cooled portion of a layer of the 3D object formed by the material forming laser.

The additive manufacturing device may also include a correction module to instruct the additive manufacturing device to take at least one corrective action based on the detection of a defect by the photodetector in the 3D object. The interferometer may be a Fabry-Perot interferometer, a Mach-Zehnder interferometer, a Michelson interferometer, a Fizeau interferometer, or a Tvyman-Green interferometer or any other interferometer described herein. The interferometer comprises a narrow band optical filter interposed between a beam splitter and the target detection area to prevent scattered remnants of electromagnetic waves from the material forming laser from entering the interferometer. The monitoring device uses homodyne detection or heterodyne detection. Further, the print path of the material forming laser is defined by a print data file defining the print layers of the 3D object.

Examples described herein also provide a method of monitoring for defects within a selective laser melting (SLM) additive manufacturing process. The method may include, with an electromagnetic wave source, projecting a detection beam onto a target detection area through an interferometer. The method may also include controlling the detection beam to follow a print path of a material forming laser, the detection beam being projected onto a cooled portion of a layer of the 3D object formed by the material forming laser. With a photodetector, displacement measuring interference between electromagnetic waves from the electromagnetic wave source and reflected electromagnetic waves from the target detection area may be detected through the interferometer.

The method may also include, with a correction module, adjusting a number of printing parameters based on the detection of a defect by the photodetector in the 3D object. Further, the monitoring device uses homodyne detection or heterodyne detection.

As used in the present specification and in the appended claims, the term "interferometer" or any of its grammatical derivatives is meant to understood broadly as any device that uses superimposed electromagnetic waves to cause interference between the superimposed electromagnetic waves in order to extract information. An interferometer may include, for example, an air-wedge shearing interferometer, an astronomical interferometer/Michelson stellar interferometer, a classical interference microscopy, a common path—bath, a cyclic interferometer, a diffraction-grating interferometer (white light), a double-slit interferometer, a dual polarization interferometry, a Fabry-Pérot interferometer, a Fizeau interferometer, a Fourier-transform interferometer, a Fresnel interferometer (e.g. Fresnel biprism, Fresnel mirror or Lloyd's mirror), fringes of equal chromatic order interferometer (FECO), a Gabor hologram, aGires-Tournois etalon, a heterodyne interferometer, a holographic interferometer, a Jamin interferometer, a laser Doppler vibrometer, a Linnik interferometer (microscopy), a LUPI variant of Michelson Lummer-Gehrcke interferometer, a Mach-Zehnder interferometer, a Martin-Puplett interferometer, a Michelson interferometer, a Mirau interferometer (also known as a Mirau objective) (microscopy), a Moiré interferometer (see moiré pattern), a multi-beam interferometer (microscopy), a near-field interferometer, a Newton interferometer, a Nomarski interferometer, a nonlinear Michelson interferometer, a step-phase Michelson interferometer, an n-slit interferometer, a phase-shifting interferometer, planar lightwave circuit (PLC) interferometer, a photon Doppler velocimeter (PDV) interferometer, a polarization interferometer, a Babinet-Soleil compensator, a point diffraction interferometer, a Rayleigh interferometer, a Sagnac interferometer, a Schlieren interferometer (phase-shifting), a shearing interferometer (lateral and radial), a Twyman-Green interferometer, a Talbot Lau interferometer, a Watson interferometer (microscopy), a white-light interferometer (see also Optical coherence tomography), a white-light scatterplate interferometer (white-light)(microscopy), a Young's double-slit interferometer, a Zernike phase contrast microscopy, other types of interferometers, variations of these and other interferometers, and combinations thereof.

Turning now to the figures, FIG. 1 is a block diagram of an in-situ monitoring device (100) for selective laser melting (SLM) additive manufacturing, according to an example of the principles described herein. The monitoring device (100) may include a coherent electromagnetic wave source (101), an interferometer (102), a photodetector (103), a control logic (104), and a material forming laser (180). The coherent electromagnetic wave source (101) may be any device that produces a monochromatic light beam. In one example, the electromagnetic wave source (101) may be a non-sintering and non-melting laser device, and, in one example may be a helium neon (HeNe) laser. The light produced by the electromagnetic wave source (101) is used to detect manufacturing defects in-situ (i.e., in a location next to where the 3D object being formed by the SLM process is taking place).

The monitoring device (100) may be a heterodyne system or a homodyne system. In a heterodyne system that combines two frequencies, a plurality of electromagnetic wave sources (101) may be used to produce the two frequencies. A homodyne system extracts information encoded as modulation of the phase and/or frequency of an oscillating signal by comparing that signal with a standard oscillation that would be identical to the signal if it carried null information. Thus, a homodyne system may use one electromagnetic wave source (101).

The material forming laser (180) may be any laser device capable of emitting coherent electromagnetic waves sufficient to form layers of a 3D object from a powder metal material. In one example, the material forming laser (180) may be any laser source that is capable of heating a build material sufficiently to melt or sinter the build material.

The interferometer (102) included within the monitoring device (100) may be as any device that uses superimposed electromagnetic waves to cause interference between the superimposed electromagnetic waves in order to extract information. An interferometer may include, for example, any type of interferometer described herein, other types of interferometers, variations of these and other interferometers, and combinations thereof. The interferometer (102) is positioned between the electromagnetic wave source (101) and a target area (150). The target area (150) may be any portion of the build material within a material bed that is or has been heated by the material forming laser (180). The interferometer (102) may also be positioned between the target area (150) and a photodetector (103) to direct electromagnetic waves reflected from the target area (150), through the interferometer (102), and to the photodetector (103). The electromagnetic waves reflected from the target area (150) interferes with the electromagnetic waves produced by the electromagnetic wave source (101) to create an interferogram that is detectable by the photodetector (103).

The monitoring device (100) may also include a photodetector (103). The photodetector (103) may be any device that senses electromagnetic waves at any number of wavelengths. For example, the photodetector (103) may be a photoemission device, a photoelectric device, a semiconductor device, a photovoltaic device, a thermal device, a photochemical device, a polarization device, graphene and silicon device, or combinations thereof.

The monitoring device (100) may also include control logic (104). The control logic (104) may be used to control the activation of the electromagnetic wave source (101), the material forming laser (180), and the photodetector (103), and processing data received from the photodetector (103) to determine if the sensed formation of the object by the photodetector (103) indicates that a defect has been formed. Thus, the control logic (104) is communicatively coupled to the photodetector (103). Further, the control logic (104) may be used to move elements of the interferometer (102) such as mirrors (FIG. 5, 507, 508) in order to direct electromagnetic waves in a desired direction. Further, the control logic (104) may be used to control the deposition of build material on a build platform of an additive manufacturing device.

Figure 2:
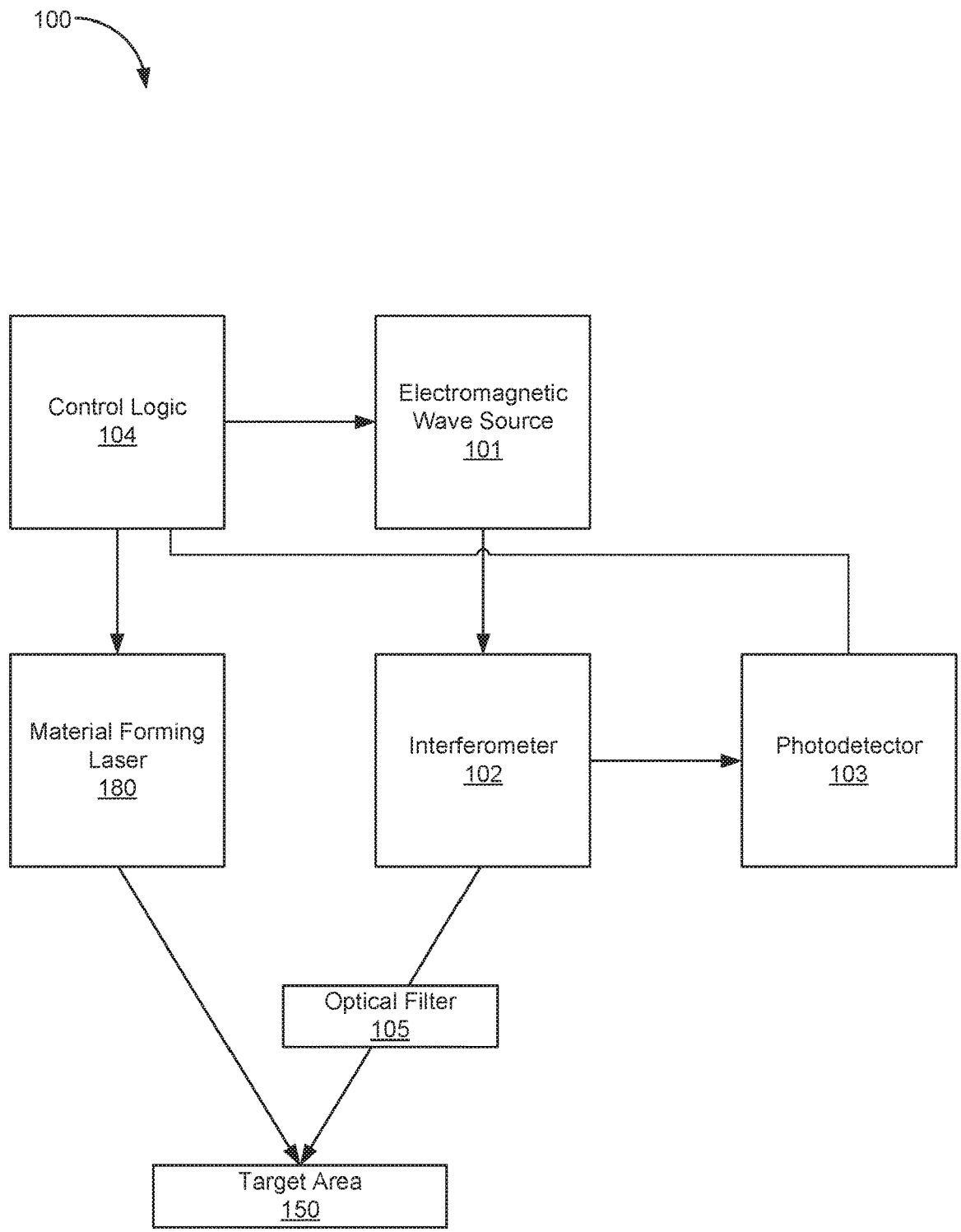
FIG. 2 is a block diagram of an in-situ monitoring device for SLM additive manufacturing, according to an example of the principles described herein.

FIG. 2 is a block diagram of an in-situ monitoring device (100) for SLM additive manufacturing, according to an example of the principles described herein. The monitoring device (100) of FIG. 2 includes similar elements as those depicted in FIG. 1 and description of these elements is provided herein in connection with FIG. 1. The example monitoring device (100) of FIG. 2 further includes an optical filter (105) interposed between the interferometer (102) and the target area (150). Specifically, the optical filter (105) may be a narrow band optical filter interposed between a beam splitter (FIG. 5, 501) of the interferometer (102) and the target area (150) to prevent scattered remnants of electromagnetic waves from the material forming laser (180) from entering the interferometer (102). Said another way, the optical filter (105) may be used to eliminate scattered radiation from the material forming laser (180). In addition to the optical filter (105), a screen such as, for example, a tubular shade may be included in order to eliminate a scattered portion of the electromagnetic waves from the electromagnetic wave source (101) and diffusively reflected from the target area.

Figure 3:
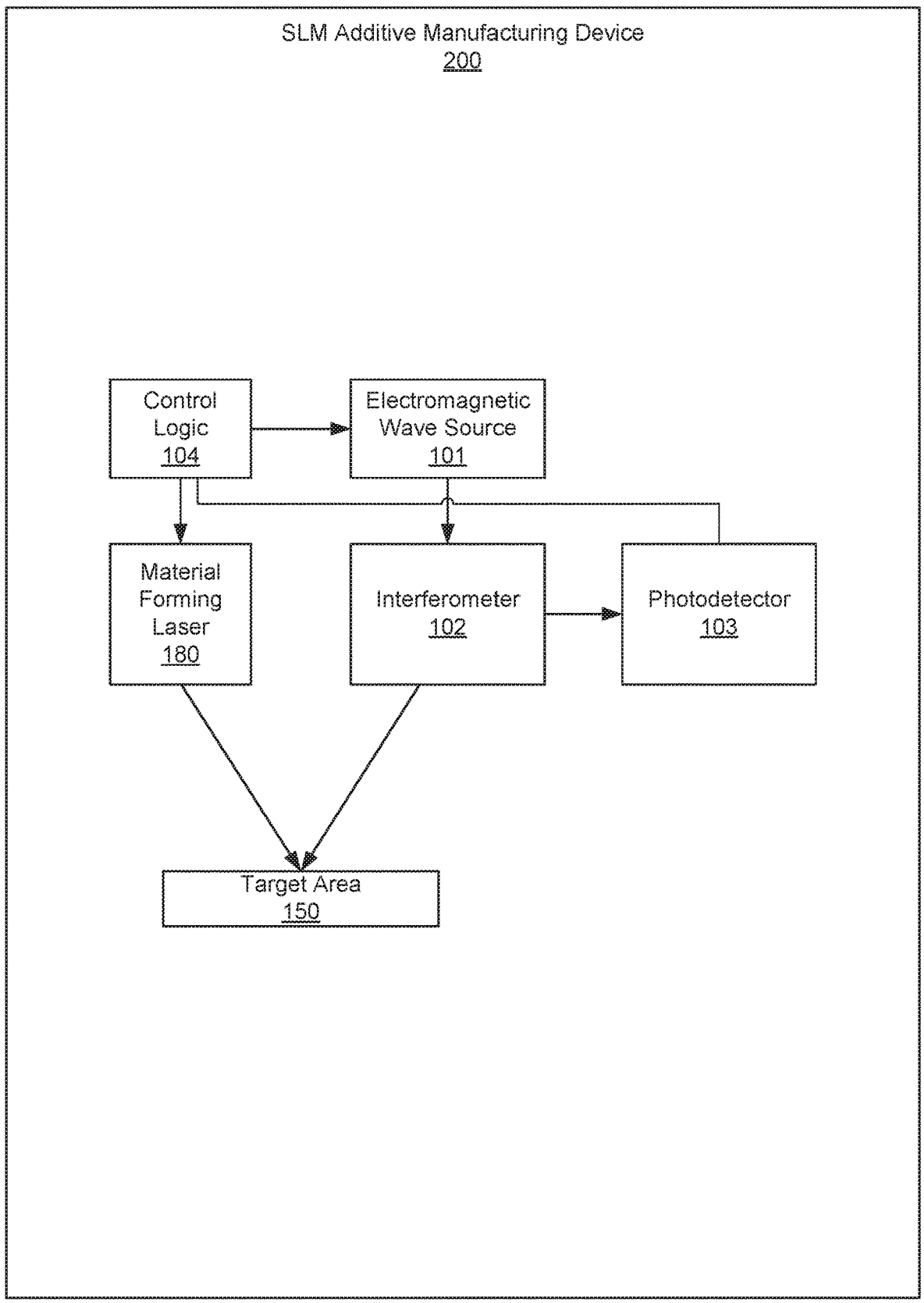
FIG. 3 is a block diagram of an SLM additive manufacturing device, according to an example of the principles described herein.
Figure 4:
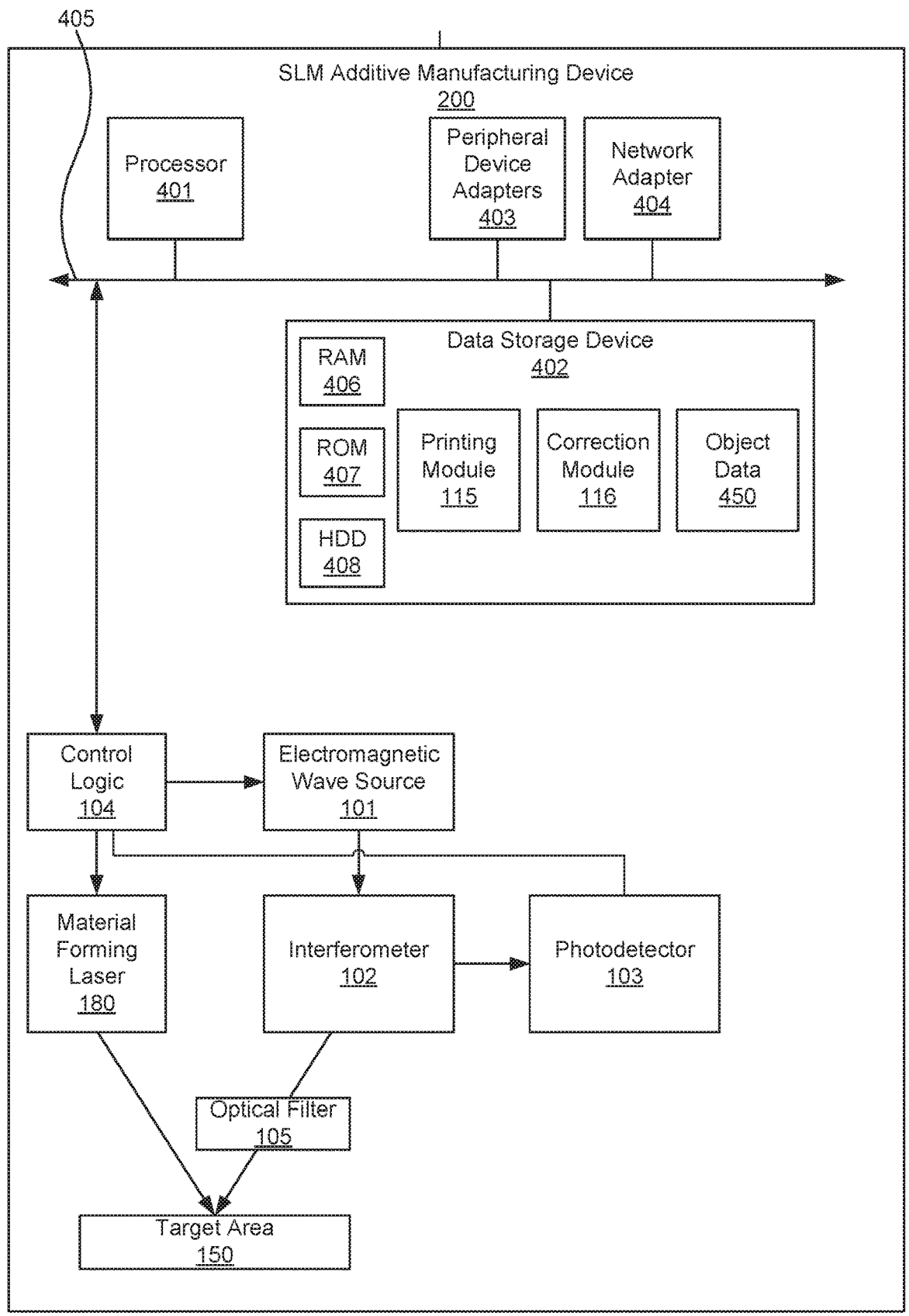
FIG. 4 is a block diagram of an SLM additive manufacturing device, according to an example of the principles described herein.

FIG. 3 is a block diagram of an SLM additive manufacturing device (200), according to an example of the principles described herein. The SLM additive manufacturing device (200) may be any device that may be used to form a 3D object. The monitoring devices (100) of FIGS. 1 and 2 may be included within the additive manufacturing device (200) and are used to detect defects that may develop in the 3D object as it is printed by the additive manufacturing device (200). The material forming laser (180) may, in some instances, create thermal stresses near an irradiated portion within the target area (150), and residual stress build-up during the printing of the printed object may cause local deformation of the printed object and even produce microcracks or macrocracks. As the loosely-packed build material dispensed on a build platform is melted by the material forming laser (180) and rapidly becomes denser, the deleterious phenomenon of thermal stresses and microcracks may be further exacerbated. These defects may be buried within the printed object as successive layers are printed and may be undetectable, Therefore, the monitoring device (100) of the additive manufacturing device (200) serves to detect these defects before a successive layer is formed over the layer in which the defects exists, FIG. 4 is an SLM additive manufacturing device (200), according to an example of the principles described herein. The SLM additive manufacturing device (200) of FIG. 4 includes elements described herein in connection with FIGS. 1 through 3 and description of these elements is provided in connection with FIGS. 1 through 3.

The SLM additive manufacturing device (200) of FIG. 4 may be any device that is used to create a 3D object through the successive formation of layers of the 3D object. The SLM additive manufacturing device (200) may be coupled to or integrated with any electronic device to provide data representing the 3D object to be printed by the SLM additive manufacturing device (200), Examples of electronic devices include, for example, servers, desktop computers, laptop computers, personal digital assistants (PDAs), mobile devices, smartphones, gaming systems, and tablets, among other electronic devices.

The SLM additive manufacturing device (200) may be utilized in any data processing scenario including, stand-alone hardware, mobile applications, through a computing network, or combinations thereof. Further, the SLM additive manufacturing device (200) may be used in a computing network, a public cloud network, a private cloud network, a hybrid cloud network, other forms of networks, or combinations thereof. In one example, the methods provided by the SLM additive manufacturing device (200) are provided as a service over a network by, for example, a third party. In this example, the service may include, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API)

as a service (APIaaS), other forms of network services, or combinations thereof. The examples described herein may be implemented on one or multiple hardware platforms, in which the modules in the system can be executed on one or across multiple platforms. Such modules may run on various forms of cloud technologies and hybrid cloud technologies or offered as a SaaS (Software as a service) that can be implemented on or off the cloud. In another example, the methods provided by the SLM additive manufacturing device (200) may be executed by a local administrator.

To achieve its desired functionality, the SLM additive manufacturing device (200) may include various hardware components. Among these hardware components may be a number of processors (401), a number of data storage devices (402), a number of peripheral device adapters (403), and a number of network adapters (404). These hardware components may be interconnected through the use of a number of busses and/or network connections. In one example, the processor (401), data storage device (402), peripheral device adapter (403), and a network adapter (404) may be communicatively coupled via a bus (405).

The processor (401) may include the hardware architecture to retrieve executable code from the data storage device (402) and execute the executable code. The executable code may, when executed by the processor (401), cause the processor (401) to implement at least the functionality of printing a 3D object based on a CAD model, monitoring the build of the 3D object by controlling the monitoring device (100), and correcting any defects that are manifested within the 3D object, according to the methods of the present specification described herein. In the course of executing code, the processor (401) may receive input from and provide output to a number of the remaining hardware units.

The data storage device (402) may store data such as executable program code that is executed by the processor (401) or other processing device. As will be discussed, the data storage device (402) may specifically store computer code representing a number of applications that the processor (401) executes to implement at least the functionality described herein. The data storage device (402) may include various types of memory modules, including volatile and nonvolatile memory. For example, the data storage device (402) of the present example includes Random Access Memory (RAM) (406), Read Only Memory (ROM) (407), and Hard Disk Drive (HDD) memory (408). Many other types of memory may also be utilized, and the present specification contemplates the use of many varying type(s) of memory in the data storage device (402) as may suit a particular application of the principles described herein. In certain examples, different types of memory in the data storage device (402) may be used for different data storage needs. For example, in certain examples the processor (401) may boot from Read Only Memory (ROM) (407), maintain nonvolatile storage in the Hard Disk Drive (HDD) memory (408), and execute program code stored in Random Access Memory (RAM) (406).

The data storage device (402) may include a computer readable medium, a computer readable storage medium, or a non-transitory computer readable medium, among others. For example, the data storage device (402) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain or store a program for use by or in connection with an instruction execution system, apparatus, or device.

The data storage device (402) may be used to store data used in the formation of the 3D object. For example, the data storage device (402) may store object data (450) such as a CAD model that provides instructions to the SLM additive manufacturing device (200) on how to form the 3D object.

The hardware adapters (403, 404) in the SLM additive manufacturing device (200) enable the processor (401) to interface with various other hardware elements, external and internal to the SLM additive manufacturing device (200). For example, the peripheral device adapters (403) may provide an interface to input/output devices, such as, for example, a display device, a mouse, or a keyboard. The peripheral device adapters (403) may also provide access to other external devices such as an external storage device, a number of network devices such as, for example, servers, switches, and routers, client devices, other types of computing devices, and combinations thereof.

The network adapter (404) allows for the SLM additive manufacturing device (200) to connect to other electrical and electronic devices. These other electrical and electronic devices may provide supporting resources to the SLM additive manufacturing device (200). In one example, the CAD model used to form the 3D object may be transmitted to the SLM additive manufacturing device (200) via the network adapter (404). In this example, the object data (450) such as a CAD model may be produced by the other electrical and electronic devices for the SLM additive manufacturing device (200) to further process and/or print the 3D object.

The SLM additive manufacturing device (200) further includes a number of modules used in the implementation of printing a 3D object based on a CAD model, monitoring the build of the 3D object by controlling the monitoring device (100), and correcting any defects that are manifested within the 3D object, according to the methods of the present specification described herein. The various modules within the SLM additive manufacturing device (200) include executable program code that may be executed separately. In this example, the various modules may be stored as separate computer program products. In another example, the various modules within the SLM additive manufacturing device (200) may be combined within a number of computer program products; each computer program product comprising a number of the modules.

The SLM additive manufacturing device (200) may include a printing module (115) to, when executed by the processor (401), print a 3D object using additive manufacturing and based on the instructions provided by the object data (450). The printing module (115) may include computer instructions that are sent to the control logic (104) to cause the material forming laser (180), the electromagnetic source (101), and the photodetector (103) to activate and begin to form the 3D object and monitor the formation of the 3D object to detect and defects that may be produced.

The SLM additive manufacturing device (200) may also include a correction module (116) to instruct the SLM additive manufacturing device (200) to take at least one corrective action. In one example, the corrective action may be taken by the correction module (116) in response to any deviation from the object data (450). The correction module (116) is executed in order to avoid internal defects within the 3D printed object. The defects refer to the deviation of the 3D object as printed from the object data (450) during the build process.

In one example, the corrective action taken by the correction module (116) may include the rejection of the 3D object. In this example, the correction module (116) causes the SLM additive manufacturing device (200) to abort the printing process if there is detected any deviation from the object data (450) as detected by the monitoring device (100). The 3D object, during the build process, may deform due to residual stresses and may eventually crack at, for example, the interface of a build plate and support structures or in regions of the 3D object with high stress concentrations. The deviation from the object data (450) as embodied in the 3D object and detected by the monitoring device (100) may be done at an early stage, and the printing of the 3D object may be aborted at that stage. Thus, catching these defects before the completion of the printing of the 3D object may save thousands of dollars in materials and time by rejecting the wrongly-build 3D objects and freeing up time for the SLM additive manufacturing device (200) to complete the printing of another 3D object that may not have any defects.

In one example, the corrective action taken by the correction module (116) may include adjusting a number of printing parameters based on the detection of a defect by the photodetector in the 3D object. The printing parameters may include, for example, the intensity of the electromagnetic waves provided by the material forming laser (180), the duration the electromagnetic waves provided by the material forming laser (180) are allowed to remain on a particular point one the build material, the activation and deactivation of the material forming laser (180), other parameters of the SLM additive manufacturing device (200), and combinations thereof.

Figure 5:
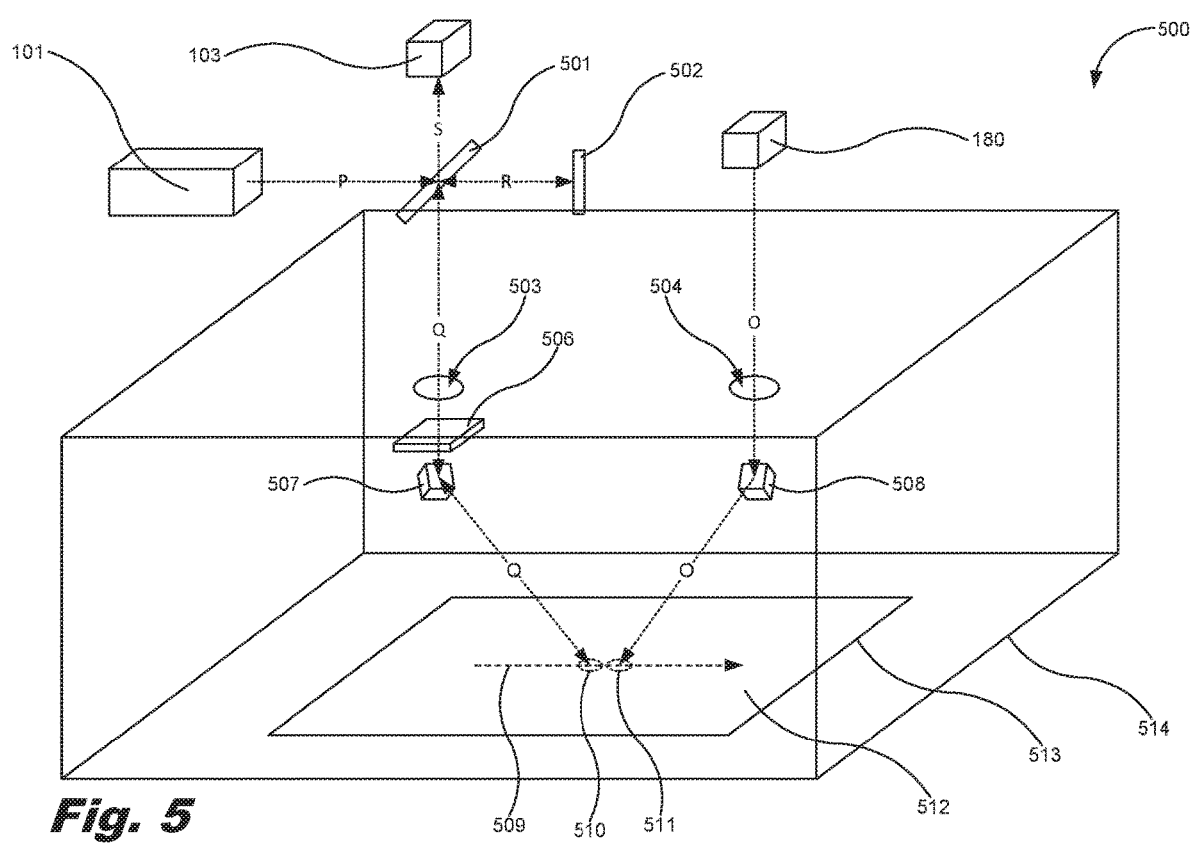
FIG. 5 is a block and ray diagram of an SLM additive manufacturing device, according to an example of the principles described herein.

FIG. 5 is a block and ray diagram of an SLM additive manufacturing device (500), according to an example of the principles described herein. The SLM additive manufacturing device (500) may include the electromagnetic wave source (101), the photodetector (103), and the material forming laser (180) as described herein in connection with FIGS. 1 through 4. FIG. 5 depicts a build platform (513) on which a layer of build material (512) may be placed to allow the material forming laser (180) to melt the build material (512) in a pattern consistent with the object data (450).

The build platform (513) may be enclosed within a printing chamber (514). The selective laser melting of the build material (512) is performed as the laser beam "O" produced by the material forming laser (180) enters the printing chamber (514) through a first window (504). Laser beam "O" produced by the material forming laser (180) may be directed by the control logic (104) steering a first mirror (508) and causing laser beam "O" to impinge upon the build material (512) along a print path (509) defined by the object data (450). The build material (512) along the print path (509) melts near the center of a first area (511) and progresses along the print path (509) in the direction of the arrow.

The displacement measuring interference (DMI) system depicted in FIG. 5 includes a Fabry-Perot interferometer. Although any interferometer may be used in connection with the examples described herein, the SLM additive manufacturing device (200) is described herein in connection with a Fabry-Perot interferometer. The interferometer (FIGS. 1 through 4, 102) may include the electromagnetic wave source (101) described herein. In one example, the electromagnetic wave source (101) may include a coherent and monochromatic light source such as, for example, a HeNe laser. The electromagnetic wave source (101) may direct light beam "P" towards a beamsplitter (501). The beam splitter (501) divides the light beam "P" into two parts. The first part of the light beam "P" may be directed downward towards the build platform (513) and may be referred to as light beam "Q". The second portion of the divided light beam "P" may be transmitted through the beamsplitter to form light beam "R." The wavelength of the electromagnetic wave source (101) may differ from that of the material forming laser (180) by at least few tens of nanometers (nm).

Light beam "Q" passes through a second window (503) and is directed by the control logic (104) and causing laser beam "Q" to impinge upon the surface of the build material (512) within a second area (510).

In one example, the exact point of impingement of light beam "Q" on the build material (512) may be selected to correspond exactly to the point where laser beam "O" impinges the surface of the build material (512). In this manner, light beam "Q" may be used to detect the formation of the layers of the 3D object as the formation of the build material by laser beam "O" occurs. In another example, the exact point of impingement of light beam "Q" on the build material (512) may be one that is shifted away from where laser beam "O" impinges the surface of the build material (512), and may be controlled such that the second mirror (507) causes light beam "Q" to follow behind laser beam "O." In this manner, light beam "Q" may be used to detect the formation of the layers of the 3D object shortly after the formation of the build material by laser beam "O." In one example, light beam "Q" acting as the detection beam may be placed on a laser-melted portion of a layer of the 3D object being formed by the material forming laser (180). In another example, light beam "Q" acting as the detection beam may be placed on a re-cooled portion of a layer of the 3D object that has been formed by the material forming laser (180) but allowed to cool at least a portion of a degree after melting by laser beam "O" that is produced by the material forming laser (180). In still another example, light beam "Q" acting as the detection beam may be placed on a portion of a layer of the 3D object that has been formed by the material forming laser (180) at any point after which the material forming laser (180) has formed the build material into a portion of the 3D object.

A portion of light beam "Q" may then be specularly reflected from the surface of the build material (512), and toward the beamsplitter (501) while its remaining part may be diffusively scattered within the printing chamber (514). Since the specular reflection occurs from a highly reflective surface of either liquid or newly solidified metal it may be expected that a substantial portion of light beam "Q" such as, for example, at least 5% to 20% may return to the beamsplitter (501).

In one example, a narrow band optical filter (506) may be positioned within the path of light beam "Q" within or outside the printing chamber (514) to prevent scattered remnants of laser beam "O" from entering the optical paths and devices of the interferometer (102). Returning light beam "Q" may impinge upon the beamsplitter (501) and interferes with light beam "R" that has been reflected from the mirror (502) towards the beamsplitter (501).

The resulting interference light beam "S" is then directed towards the photodetector (103) which quantifies the intensity of the interference light beam "S", Signal intensity at the photodetector (103) may depend on the length difference between the optical paths of light beams "Q" and "R." According to the interference principle, this difference reaches a maximum when these optical paths differ by an even multiplicity of the wavelength as reflected from the target area (150) and is at minimum when this difference equals an odd multiplicity of the wavelength as reflected from the target area (150). Intermediate signal values occur when the path difference is between these maximums and minimums.

The first and second mirrors (507, 508) are computer controlled and are communicatively coupled to the processor (401) and the control logic (104) of the SLM additive manufacturing device (200). The locations of points where light beams "Q" and "O" intersect the surface of the build material (512) may be precisely determined through control of the first and second mirrors (507, 508). The ability to precisely calculate location of these points, particularly with respect to light beam "Q," provides for the ability to calculate a difference "Δ" in distances travelled by light beams "Q" and "R." With this information, the intensity of light beam "S" resulting from the interference of light beams "Q" and "S" may be determined.

As light beam "Q," in conjunction with light beam "O," travels along a predefined path on the surface of the build material (512) as determined by the object data (450), "Δ" changes in a predictable manner. Any deviation from a predicted or expected change of the interference signal as detected by the photodetector (103) is due to local deformation such as, for example, buckling, bending, and/or cracking, of the surface of melted build material (512) as reflected and included in light beam "Q." Thus, this reflection and its interference with light beam "Q" may be used to detect a deviation from the object data (450) that results in a deformation in the printed 3D object.

The value of the interference signal measured by the photodetector (103) oscillates between the maximum where interfering signals add to each other, and the minimum, where the interfering signal subtract from each other. Sensitivity of the photodetectors (103) measurements may be estimated to be between 0.01 and 0.05 of the maximum signal. Thus, the SLM additive manufacturing device (200) may detect minimum surface deformation roughly corresponding to 0.01 to 0.05 of the lasers wavelength. In the case of a 632.8 nm HeNe laser as the electromagnetic wave source (101), this may be translated into a surface deformation of about 6 nm to 10 nm as being a detectable deformation or deviation from the object data (450). In practice, further decrease of the measurement sensitivity may be expected due to rapid metal freezing causing ambient turbulence above and surface roughness of the newly melted and solidified build material. However, even when raising the detection limit by a factor between 10× and 100×, the SLM additive manufacturing device (200) may be capable of detecting surface disturbance due to deformation and cracking which are expected to be within the range of hundreds of nm to tens of microns.

The relative location of light beams "Q" and "O" on the surface of the build material (512) may be selected to increase measurement sensitivity. Light beam "Q" may intersect the surface of the build material (512) at exactly the same point as laser beam "O" resulting in the situation where light beam "Q" may impinge upon a newly melted metal. Molten metal surface is highly reflecting but turbulent. In addition, metal vapor and air turbulence above the molten area may further impede desired light reflection. In another example, light beam "Q" may track or trace laser beam "O" along the print path (509) with a few seconds delay allowing melted and then solidified build material (512) to relax stress that may cause local surface deformation or cracking detectable by the SLM additive manufacturing device (200). In one example where the laser beam "O" may follow the exact path defined by the object data (450) describing layer-by-layer the 3D printed object, placing light beam "Q" at a predefined distance from laser beam "O." Well controlled spacing between light beam "O" and laser beam "O" may be tuned and optimized for in-situ layer deformation sensing.

The surface defects measurement may be implemented with a variety of optical and electronic solutions. In one example, the measurement may be performed using a single laser wavelength that results in a homodyne measurement. In this example, displacement may be quantified by determining optical intensity of the interference light beam "S" using either photoelectric or photovoltaic sensor as the photodetector (103). The optical elements of the SLM additive manufacturing device (200) may incorporate a variety of interferometers as listed and described herein.

In another example, surface deformation measurement may rely on heterodyne measurements involving at least two electromagnetic wave sources (101) emitting light beams with slightly shifted frequencies. In one example a HeNe laser may be capable of producing two beams having perpendicular polarizations and frequencies that are shifted by the Zeeman Effect. In this example, one of the light beams may provide a reference and the other beam may be used as a distance probe. The two separate light beams in this example may be analogous to light beams "R" and "Q" in FIG. 1. The two light beams may be separated and then recombined with a polarization sensitive beamsplitter (501). The combined beams may be directed at a measurement signal transimpedance amplifier capable of sensing Doppler shift between the two light beams. A sudden variation of the Doppler shift may be used as indication of the surface deformation or cracking. Due to a difference in sensor electronics, the heterodyne example may provide increased sensitivity in situations where the system includes a high-speed scanning laser as the material forming laser (180).

Figure 6:
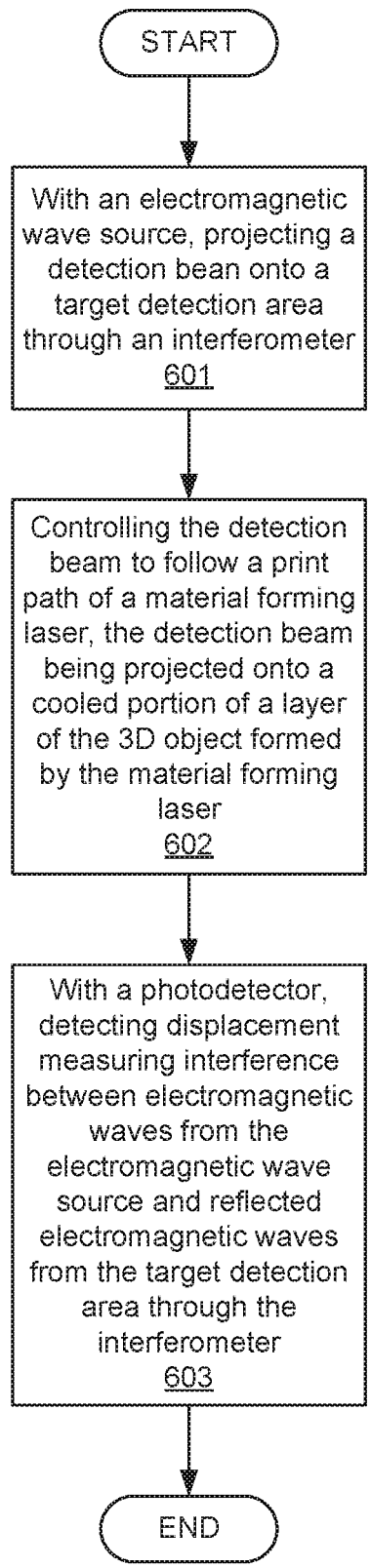
FIG. 6 is a flowchart showing a method of monitoring for defects within an SLM additive manufacturing process, according to an example of the principles described herein.

FIG. 6 is a flowchart showing a method (600) of monitoring for defects within an SLM additive manufacturing process, according to an example of the principles described herein. The method (600) may include, with an electromagnetic wave source (101), projecting (block 601) a detection beam onto a target detection area such as the target area (150) through an interferometer (102). The electromagnetic wave source (101) projected (block 601) may be a homodyne or heterodyne detection beam.

The method may also include controlling (block 602) the detection beam to follow a print path (509) of a material forming laser (180), the detection beam being projected onto a cooled portion of a layer of the 3D object formed by the material forming laser (180). With a photodetector (103), detecting displacement measuring interference between electromagnetic waves from the electromagnetic wave source (101) and reflected electromagnetic waves from the target detection area (513) through the interferometer (101).

Figure 7:
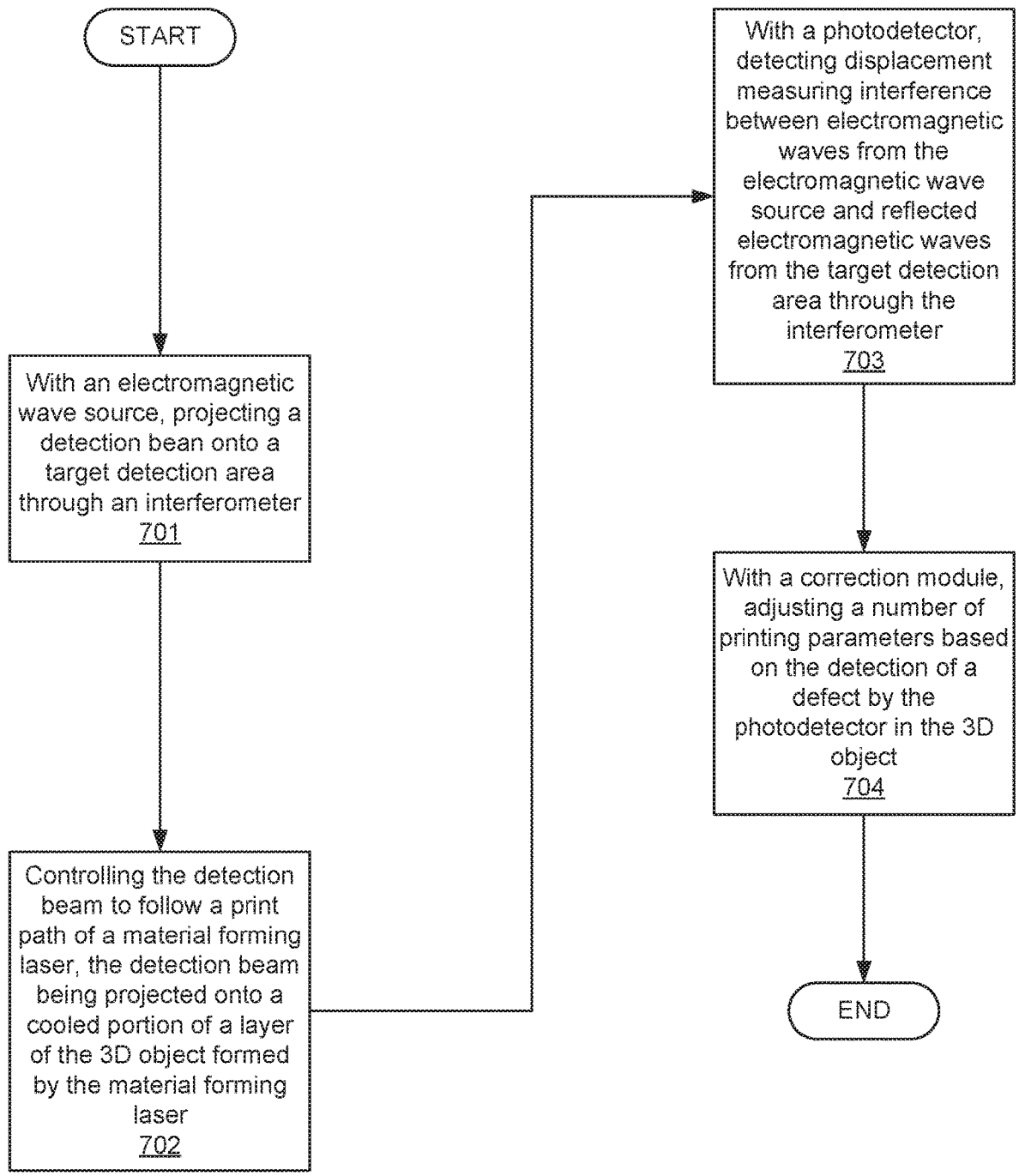
FIG. 7 is a flowchart showing a method of monitoring for defects within an SLM additive manufacturing process, according to an example of the principles described herein.

FIG. 7 is a flowchart showing a method (700) of monitoring for defects within an SLM additive manufacturing process, according to an example of the principles described herein. The method (700) may include blocks 701 through 703 that are similar to blocks 601 through 603 of FIG. 6 and description regarding these blocks are described in connection with FIG. 6. The method of FIG. 7 may also include, with a correction module (FIG. 116), adjusting (block 704) a number of printing parameters based on the detection of a defect by the photodetector (103) in the 3D object. As described herein, correction may include, for example, rejection of the 30 object where the SLM additive manufacturing device (200) aborts the printing process if there is detected any deviation from the object data (450) as detected by the monitoring device (100). In one example, the corrective action taken by the correction module (116) may include adjusting a number of printing parameters based on the detection of a defect by the photodetector in the 3D object.

Aspects of the present systems and methods are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (401) of the SLM Additive Manufacturing Device (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe an in-situ monitoring device for selective laser melting (SLM) additive manufacturing. The in-situ monitoring device for selective laser melting (SLM) additive manufacturing may include at least one coherent electromagnetic wave source to produce a detection beam, an interferometer interposed between the electromagnetic wave source and a target detection area, a photodetector to detect displacement measuring interference between electromagnetic waves from the electromagnetic wave source and reflected electromagnetic waves from the target detection area through the interferometer, and control logic to cause the detection beam to follow a print path of a material forming laser at a distance behind the material forming laser. The detection beam is placed on a laser-melted portion of a layer of a three-dimensional (3D) object formed by the material forming laser.

The in-situ monitoring device included within an additive manufacturing device is able to detect even vary small deficiencies in the formation of a 3D object. Further, the monitoring device may ensure that defective 3D objects are not provided to a consumer or otherwise used. The monitoring device may also significantly reduce costs in manufacturing devices using the additive manufacturing device by stopping the manufacturing process once a defect has been detected before more time and build materials are used to complete an entire 3D object that have been.

The preceding description has been presented to illustrate and describe examples of the principles described. This description is not intended to be exhaustive or to limit these principles to any precise form disclosed. Many modifications and variations are possible in light of the above teaching.

What is claimed is:

1. An in-situ monitoring device for selective laser melting (SLM) additive manufacturing, comprising:
   at least one coherent electromagnetic wave source to produce a detection beam;
   an interferometer interposed between the electromagnetic wave source and a target detection area;
   a photodetector to detect displacement measuring interference between electromagnetic waves from the electromagnetic wave source and reflected electromagnetic waves from the target detection area through the interferometer; and
   control logic to:
     cause the detection beam to follow a print path of a material forming laser at a distance behind the material forming laser; and
     detect, based on the displacement measuring interference, a defect in a three-dimensional (3D) object formed by the material forming laser,
   wherein the detection beam is placed on a laser-melted and at least partially solidified portion of a layer of the 3D object.

2. The monitoring device of claim 1, wherein the interferometer is a Fabry-Perot interferometer, a Mach-Zehnder interferometer, a Michelson interferometer, a Fizeau interferometer, or a Tvyman-Green interferometer.

3. The monitoring device of claim 1, wherein the interferometer comprises a narrow band optical filter interposed between a beam splitter of the interferometer and the target detection area to prevent scattered remnants of electromagnetic waves from the material forming laser from entering the interferometer.

4. The monitoring device of claim 1, wherein the monitoring device uses homodyne detection.

5. The monitoring device of claim 1, wherein the monitoring device uses heterodyne detection.

6. The monitoring device of claim 1, wherein the print path of the material forming laser is defined by a print data file defining the print layers of a 3D object.

7. A selective laser melting (SLM) additive manufacturing device, comprising:
   a material forming laser to form layers of a three-dimensional (3D) object;
   an electromagnetic wave source to produce a detection beam;
   a beam splitter to:
     direct a first part of electromagnetic waves from the electromagnetic wave source towards a target detection area; and
     direct a second part of the electromagnetic waves from the electromagnetic wave source towards a mirror, wherein a portion of the first part reflected from the target detection area interferes with a portion of the second part reflected off the mirror;
   an interferometer interposed between the electromagnetic wave source and the target detection area;
   a photodetector to detect displacement measuring interference between reflected electromagnetic waves from the mirror and reflected electromagnetic waves from the target detection area through the interferometer; and
   control logic to:
     cause the detection beam to follow a print path of the material forming laser; and
     detect based on the displacement measuring interference, a defect in the 3D object, wherein the detection beam is placed on a re-cooled portion of a layer of the 3D object formed by the material forming laser.

8. The additive manufacturing device of claim 7, comprising a correction module to instruct the additive manufacturing device to take at least one corrective action based on the detection of a defect by the photodetector in the 3D object.

9. The additive manufacturing device of claim 7, wherein the interferometer is a Fabry-Perot interferometer, a Mach-Zehnder interferometer, a Michelson interferometer, a Fizeau interferometer, or a Tvyman-Green interferometer.

10. The additive manufacturing device of claim 7, wherein the interferometer comprises a narrow band optical filter interposed between a beam splitter and the target detection area to prevent scattered remnants of electromagnetic waves from the material forming laser from entering the interferometer.

11. The additive manufacturing device of claim 7, wherein the monitoring device uses homodyne detection or heterodyne detection.

12. The additive manufacturing device of claim 7, wherein the print path of the material forming laser is defined by a print data file defining the print layers of the 3D object.

13. A method of monitoring for defects within a selective laser melting (SLM) additive manufacturing process, comprising:
    with an electromagnetic wave source, projecting a detection beam onto a target detection area through an interferometer;
    controlling the detection beam to follow a print path of a material forming laser, the detection beam being projected onto a cooled portion of a layer of the 3D object formed by the material forming laser;
    with a photodetector, detecting displacement measuring interference between electromagnetic waves from the electromagnetic wave source and reflected electromagnetic waves from the target detection area through the interferometer; and
    with control logic, detecting a defect in the 3D object based on a deviation of the displacement measuring interference with an expected interference indicated in object data for the 3D object.

14. The method of claim 13, comprising, with a correction module, adjusting a number of printing parameters based on the detection of a defect by the photodetector in the 3D object.

15. The method of claim 13, wherein the photodetector uses homodyne detection or heterodyne detection.

16. The additive manufacturing device of claim 7, wherein the material forming laser and electromagnetic wave source are formed outside of a printing chamber in which the 3D object is formed.

17. The additive manufacturing device of claim 16, wherein:
    a laser from the material forming laser is to enter the printing chamber via a first window; and
    the detection beam is to enter the printing chamber via a second window.

18. The monitoring device of claim 1, wherein the photodetector is to quantify an intensity of an interference beam comprising the reflected portions.

19. The monitoring device of claim 17, wherein the photodetector is to quantify the intensity by determining a difference in length of optical paths of the first part and the second part of the electromagnetic waves from the electromagnetic wave source.

20. The method of claim 13, further comprising aborting a printing process responsive to a detected deviation between the displacement measuring interference and the expected interference.

* * * * *